May 15, 1928.
L. BLOCH
VALVE ACTUATING DEVICE
Filed March 11, 1925
1,669,650
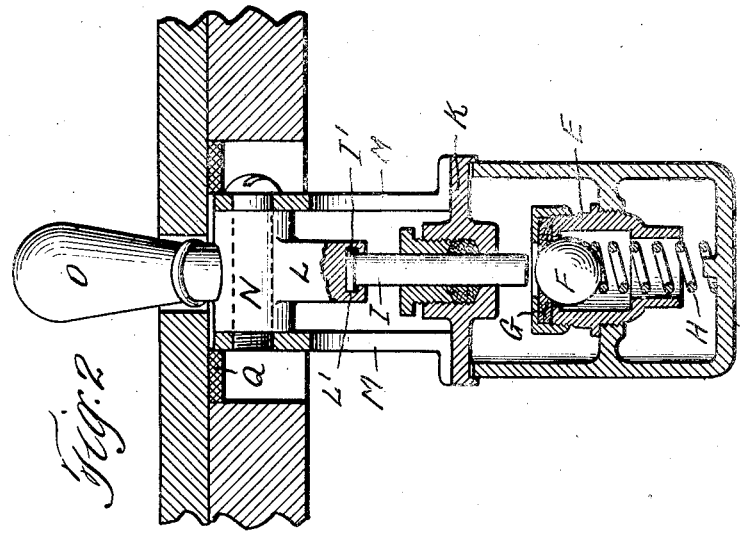
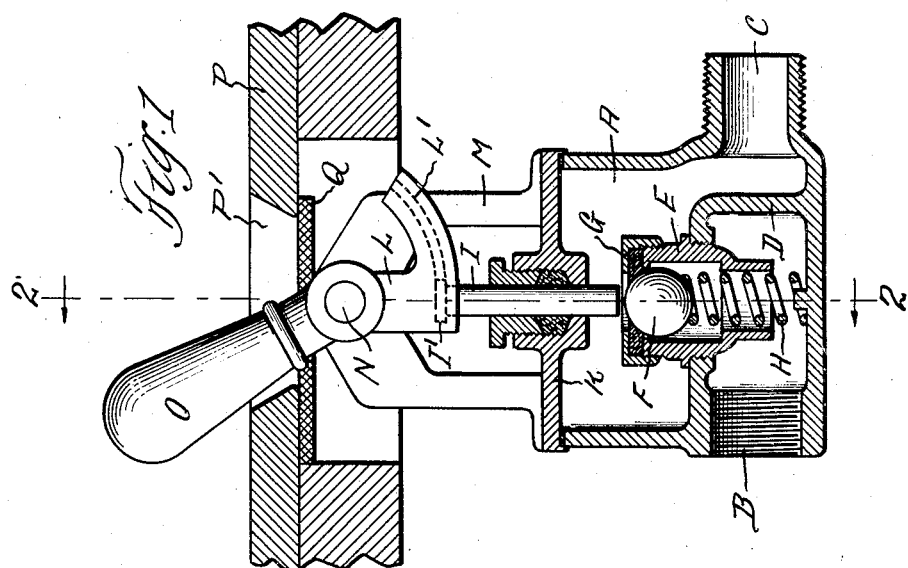
INVENTOR
Leon Bloch
By Hull, Brock & West
Attys.

Patented May 15, 1928.

1,669,650

UNITED STATES PATENT OFFICE.

LEON BLOCH, OF CLEVELAND, OHIO, ASSIGNOR TO THE REPUBLIC BRASS COMPANY, OF CLEVELAND, OHIO, A CORPORATION OF OHIO.

VALVE-ACTUATING DEVICE.

Application filed March 11, 1926. Serial No. 93,909.

This invention is a novel form of valve actuating mechanism particularly adapted for use in connection with valves constituting a part of a bathroom fixture. This form of valve and actuating mechanism is particularly adapted for use in connection with the bathroom fixture disclosed in my application Serial No. 93,911, filed March 11, 1926, now Patent No. 1,647,983, and may be built as a part thereof, if so desired.

One object of the invention is to provide a simple form of valve actuator which can be arranged in the tile wall of the bathroom and will expose only the actuating handle after the well known manner of exposing an electric switch for the operation of electric lights.

Another object of the invention is to provide a device embodying these characteristic features and advantages which will be simple in construction and easy to operate in such a manner that the flow of water can be totally or partially cut on or off as desired.

With these various objects in view, the invention consists in the details of construction and novel manner of combining or arranging the same all of which will be fully described hereinafter and set forth in the appended claims.

In the drawings forming part of this specification, Fig. 1 is a sectional elevation showing one embodiment of my invention and Fig. 2 is a similar view taken on the line 2—2 of Fig. 1.

It will be understood that any desired valve construction may be employed but for the purpose of illustration I have shown a casing A having an opening B at one side thereof and an opening C at the opposite side thereof and within the casing is a partition D in which is arranged a sleeve E for the purpose of receiving the ball valve F which seats against a properly constructed and connected seat G, said ball being seated through the medium of a coil spring H contained within the sleeve E and bearing upon the bottom of the casing A.

The ball valve F is unseated by means of the stem I working through a stuffing box in the cap K of the casing. This stem I at its outer end is operatively connected to a cam lever L pivotally mounted between the brackets M connected to and extending outwardly from the cap K, a pivot pin N extending through said brackets and cam lever L. The outer end of the cam lever L is formed into a handle O and this handle O is adapted to work in a slot P' in the plate P which plate may be either of metal or it may be a tile plate constituting a part of the tile wall of the bathroom. A packing strip Q can be employed, if so desired, upon the inner side of the plate or tile P.

The inner end of the cam lever L is formed with a cam groove L' in which works the head I' of the stem I. In the drawings I have shown the lever in such position that the valve F is closed and when it is desired to open the valve it is only necessary to shift the lever to the opposite position and turning upon its pivot N the cam M thereof will force the stem inwardly and upon the valve.

As previously stated, the valve may be of any desired construction and the form illustrated has been chosen merely for the purpose of showing a complete operative device.

When the device is installed only the handle O will be exposed and this handle may be porcelain in case it works through a tile plate and if it should work through a metallic plate it may be made of the same metal as the plate thereby producing a very neat and attractive fixture.

A device of this kind can be built in any desired number of units for the purpose of perfecting the desired control of the hot and cold water and as previously stated may be built into the bathroom fixture device shown in my application of even date, this being a very convenient form of combination device in which an apparatus such as herein shown and described could be arranged at each end of each side of the bathroom fixture previously referred to.

It will thus be seen that I provide an exceedingly cheap and simple form of valve actuated mechanism which lends itself very readily to the neat bathroom installation.

Having thus described my invention, what I claim is:

1. In a device of the class described adapted to be arranged within an opening in a wall structure, a casing having a partition therein dividing the same into a plurality of compartments and having an opening therein, a sleeve detachably secured in said opening, a valve seat detachably secured to said sleeve, a valve normally engaging said valve seat, said valve and valve seat being removable from the opening in said partition, a stem slidably mounted in said casing in axial alignment with said valve and movable with respect to said valve, means for depressing said stem into engagement with said valve to open the same comprising a lever having its inner end operatively connected with said stem and its outer end projecting through the opening in the wall structure, and means normally holding said valve on its seat.

2. A device of the class described adapted to be arranged within a wall structure, comprising a casing having a partition therein dividing the same into a plurality of compartments, said partition having an opening therein, a sleeve detachably secured in said opening, a valve seat detachably secured to said sleeve, a valve normally engaging said valve seat, means for opening said valve comprising a stem slidably mounted in said casing, a cam lever pivotally mounted on said casing and having its inner end operatively connected with said valve stem and its outer end adapted to project through an opening in the wall structure.

3. A device of the class described adapted to be arranged within an opening in a wall structure, a valve casing having a partition dividing the same into a plurality of compartments, said partition having an opening therein, a sleeve arranged within said opening, a valve seat detachably secured to said sleeve, a vlave for closing said opening and means for opening said valve comprising a stem slidably mounted in said casing independent of said valve, a lever pivotally mounted on said casing having its inner end operatively connected with said stem and its outer end projecting through said opening in the wall structure whereby said lever may be actuated to open said valve, and means for closing said valve.

4. In a device of the class described adapted to be secured within an opening in a wall structure, a valve casing having a partition therein dividing the same into a plurality of compartments, said partition having an opening therein and a sleeve detachably secured in said opening, a valve seat detachably secured to the upper end of said sleeve, a valve normally engaging said valve seat, a stem slidably mounted in said casing in axial alignment with said valve and normally out of engagement with said valve, means for depressing said stem to open said valve comprising a cam lever pivotally mounted adjacent said valve stem and having its inner end operatively connected with said stem and its outer end projecting through said opening in the wall structure and means for closing said valve.

5. A valve mechanism of the class described adapted to be arranged within an opening in a wall structure and comprising a valve casing having a partition therein dividing the same into a pair of compartments, said partition having an opening therein, a sleeve detachably secured in said opening, a valve seat detachably secured to said sleeve, a valve normally engaging said valve seat, a valve stem slidably mounted in said casing in axial alignment with said valve and movable with respect to said valve, means for depressing said stem into engagement with said valve to open the same, a lever pivotally mounted on said casing and having its inner end operatively connected with said valve stem and its outer end projecting through the opening in the wall structure, and means normally urging said valve toward its seat.

6. The combination with a wall having an opening therein and a facing for said wall, said facing having an opening therein connected with the opening in the wall, of a valve mechanism arranged within the wall structure and behind the wall opening and comprising a casing having a partition therein, said partition having an opening therein, a sleeve secured within the opening in said partition, a valve seat carried by the upper end of said sleeve, a valve normally engaging said valve seat, a valve stem slidably mounted in said casing in axial alignment with said valve and movable with respect thereto, means for depressing said valve stem into engagement with said valve to open the same and spring means normally urging said valve toward its seat, a part of the valve actuating means projecting through said wall opening and facing and operable from the exterior thereof, said valve, valve seat and sleeve being readily removable from the opening of said partition without removing the valve casing from the opening in the wall structure.

7. The combination with a wall having an opening therein and a facing for said wall opening, said facing having an opening therein connected with the opening in the wall, of a valve mechanism arranged within the wall structure and behind the wall opening and comprising a casing having a partition therein, said partition having an opening therein, a sleeve secured within the opening in said partition, a valve seat carried by the upper end of said sleeve, a valve normally engaging said valve seat, a valve stem slidably mounted in said casing in axial alignment with said valve and movable with respect thereto, means for depressing said stem into engagement with said valve to open the same and spring means urging said valve toward its seat, a part of said last mentioned means projecting through said facing and wall opening and operable from the exterior thereof, said valve, valve seat and sleeve being removable from the opening in said partition.

In testimony whereof, I hereunto affix my signature.

LEON BLOCH.